Figure 2:
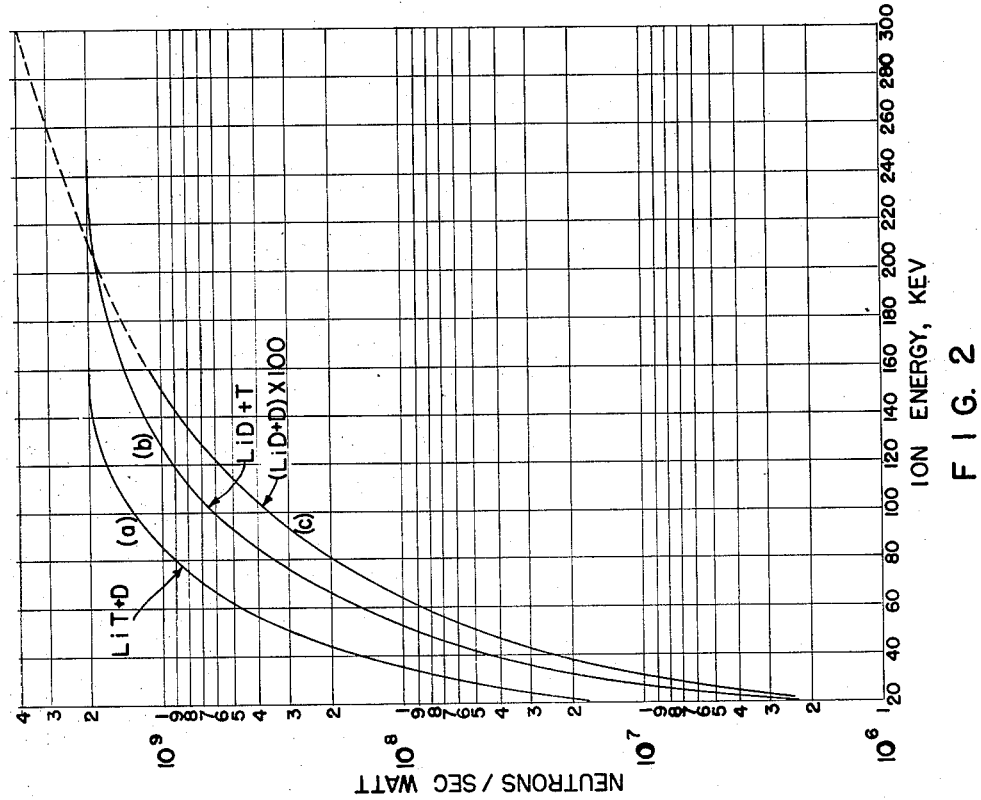

Aug. 25, 1964

C. W. TITTLE 3,146,366

NEUTRON GENERATION

Filed Oct. 5, 1959

INVENTOR.
CHARLES W. TITTLE
BY
*Joseph Weingarten*
ATTORNEY

United States Patent Office 3,146,366
Patented Aug. 25, 1964

3,146,366
NEUTRON GENERATION
Charles W. Tittle, Dallas, Tex., assignor, by mesne assignments, to Laboratory for Electronics, Inc., Boston, Mass., a corporation of Delaware
Filed Oct. 5, 1959, Ser. No. 844,238
2 Claims. (Cl. 313—61)

The present invention relates in general to apparatus for producing neutrons and particularly to a specific mixture of deuterium and tritium gas which, when used as an ion source in a neutron generator tube in conjunction with a deuterium target, provides a constant neutron output level.

Neutron generator tubes are well known in the art and have been used most extensively in applying the techniques of nuclear oil well logging. In brief, well logging is accomplished by lowering a cartridge containing a neutron source and various nuclear radiation detectors through an oil well bore hole and recording the response of the detectors as a function of depth. The quantity and type of radiations detected serve as an indication of the geological composition of the strata adjacent to the bore hole in that radiations resulting from neutron interactions with various materials are somewhat characteristic of the elemental composition of the materials themselves.

The technique requires a neutron flux which remains essentially constant in time since determination of the specific reaction rate of the neutrons with the adjacent strata requires accurate knowledge of the number of generated neutrons and since the identification of strata relates to this specific reaction rate. This period of constant flux should be for a period no less than about eight hours, which is the time required for logging an average oil well.

Initial work in this field employed neutron sources such as radium-beryllium, in which the alpha particles from radium interacted specifically with beryllium to produce neutrons. These sources, however, could provide only a relatively low neutron output, as for example $10^7$ neutrons per sec., within reasonable economic limits, and were further a source of personnel hazard since the radioactive substance continually emitted large quantities of dangerous radiation. More recent work has employed neutron generator tubes, which utilize reactions between the isotopes of hydrogen to produce the neutron flux. These generators are essentially dormant unless high voltage is supplied, hence can be controlled and do not present a personnel hazard. Again, since the hydrogen isotopes are relatively inexpensive, efficient models of this type of neutron source can produce outputs up to $10^8$ neutrons per second or more.

Broadly speaking, this class of generators produces neutrons by accelerating ions of deuterium or tritium or both into targets also containing deuterium, tritium, or both. The specific neutron generating reactions involved may then be any of three; namely, deuterium on tritium, deuterium on deuterium, or tritium on deuterium; tritium striking tritium having no neutron productive reaction. As might be expected, these reactions are not equally efficient in neutron production. For example, at a typical accelerating energy of 80 kev., the deuterium-tritium reaction produces 2.6 times as many neutrons as the tritium-deuterium reaction and 350 times as many as the deuterium-deuterium reaction. On this basis, a tritium target would be the most efficient. However, tritium is a naturally radioactive substance decaying by beta emission to Helium-3. Thus, if a neutron generator tube having a volume of 200 cm.$^3$ were constructed having a target containing one curie of tritium, enough Helium-3 would be generated in four days to produce a gas pressure of one micron; this pressure being sufficient to render the tube substantially inoperative. This tube would have such a limited "shelf life" as to render it impractical for logging purposes. If the somewhat less efficient technique of using a deuterium target and bombarding it with tritium ions is employed, the resultant neutron flux decreases in level with operation, since the tritium ions bombarding the target gradually displace the deuterium in the target and the resultant tritium-tritium collisions do not produce neutrons.

The present invention contemplates and has as a primary object the provision of novel compositions of gases for use with deuterium targets whereby a high level neutron flux is generated at substantially a constant rate over a long period of time.

It is another object of this invention to provide a novel mixture of gases formulated as a function of bombarding energy whereby a high level neutron flux may be maintained substantially constant for a prolonged period of time.

Figure 1:
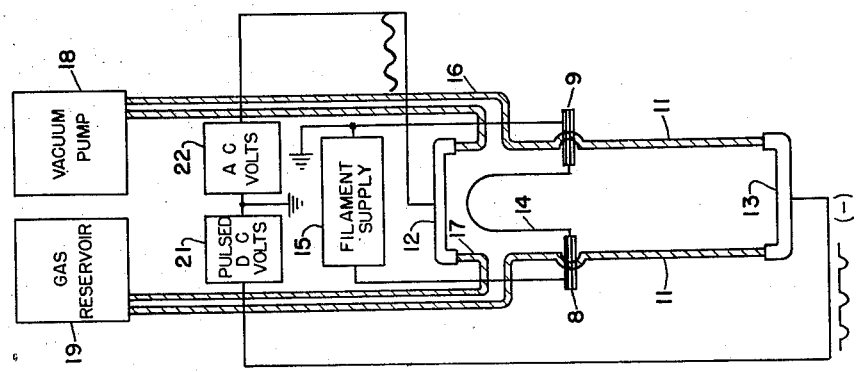

These and other objects will become apparent from the following detailed discussion taken in conjunction with the accompanying drawings in which:

FIG. 1 is an illustration partly in schematic form of a typical neutron generator tube; and FIG. 2 is a graphical representation of neutron yield as a function of ion energy for a variety of reactions.

Broadly speaking, the present invention teaches mixtures of deuterium and tritium gas as a function of the energy used to accelerate ions of the mixture to a deuterium target in a neutron generator tube, which mixtures only will provide a constant high level neutron flux for a prolonged period.

More specifically, FIG. 1 illustrates a typical neutron generator tube wherein the neutron generator tube is seen to comprise a generally cylindrical glass envelope 11 capped at both ends by conductive metal electrode cups 12 and 13, hermetically sealed to the glass in the conventional manner. A filament electrode 14 of tungsten wire is conductively supported upon metal rods 8 and 9 which are hermetically sealed through the glass envelope. The opposed ends of filament 14 are connected to a filament power supply 15, and one end of filament 14 is grounded.

A pair of tubes 16 and 17 open into the interior of envelope 11 and furnish means for connecting a vacuum pump 18 and gas reservoir 19, respectively. Electrode 12 is connected to the positive side of A.C. voltage supply 22, and electrode 13 is connected to the negative terminal of a pulsed D.C. voltage supply 21. Electrode 13 is coated on its inner surface with a substance containing deuterium, for example, lithium deuteride.

The operation of this tube in the practice of this invention would be as follows: Gas reservoir 19 and pump 18 are operated to maintain a continuing flow and supply of gas, comprising a mixture of deuterium and tritium in a proportion described below, within envelope 11. Filament 14 is heated by current from filament supply 15 causing electrons to be emitted within the envelope 11. The positive potential, which may be between a few volts and a few kilovolts, is applied to electrode 12 relative to filament 14 by A.C. supply 22, causing the emitted electrons to be accelerated toward electrode 12. Deuterium and tritium ions are thus formed by collision in the gas. These ions are axially accelerated past the filament towards deuterium coated target electrode 13 by the electric field created with the application of a negative potential of the order of 60 to 100 kilovolts to target 13 relative to electrode 12, producing neutrons through D (d,N) and D (t,n) reactions. As the tube is operated the target coating becomes contaminated with tritium from the gas mixture finally achieving an equilibrium condition where the deuterium-tritium proportion in the target is the same as that in the gas. Thus added to the above two reactions is a buildup of T $(d,n)$ reaction.

FIG. 2 is seen to be a graphical representation of neutron output per watt-sec. as a function of the energy of the incident ion, wherein curve $(a)$ shows the dependence for LiT+D, curve $(b)$ that for LiD+T and curve $(c)$ for LiD+D. With reference to FIG. 2, it can be seen that for all three reactions the neutron output increases with increasing energy of the ions, but that at any given energy, the LiT+D reaction yields more neutrons than the LiD+T and that both yield far more neutrons than LiD+D.

Taking a specific example of 80 kev., it is seen that for LiT+D (deuterons bombarding a tritium target) the neutron yield is 2.6 times that for LiD+T (tritons bombarding a deuterium target) at the same energy. If, however, a deuterium target is employed and a mixture of deuterium and tritium gas is used to form the bombarding ions where we let $f$ be the fractional amount of tritium in the gas and $(1-f)$ the fractional amount of deuterium and we further assume that at equilibrium the fractional amounts of tritium and deuterium in the target would then be given by $f$ and $(1-f)$ respectively, the final neutron yield is proportional to $$f(1-f)+2.6(1-f)(f)$$

which equals $$3.6f(1-f)$$

In order to obtain a constant output, we set the initial neutron yield, $f$, equal to the final yield at equilibrium and thus, $$f=3.6f(1-f)=.72 \text{ (for 80 kev.)}$$

To obtain this fractional amount for any energy of ions, we may use the formula $$f=\frac{r}{1+r}$$

where $r$ is the ratio of D–T to T–D neutron yield for that energy.

The neutron yield is not as high with this value of $f$ as it would be for other values. The optimum value of $f$ for maximum neutron output in a target whose amounts of T and D are maintained at equilibrium values from the beginning (i.e., if the target is allowed to contain T at first) can be shown to be .5 under the same assumptions as above (the primary assumption being that isotopic effects are negligible). For this condition, the output is proportional to $$(.5)(.5)+2.6(.5)(.5)=.9 \text{ at 80 kev.}$$

whereas with the value of $f$ derived above for the optimum condition, starting with no T in the target, the output is proportional to .72. However, with the ratio for a pure deuterium target, as indicated above, the problem presented by tritium decay into He in the target is avoided until neutrons have actually been produced; thus the generator tube has an indefinitely long shelf life, yet is capable of producing a high level, constant in time, flux.

While the present invention has here been described with reference to a particular neutron generator tube, it is apparent that it applies to any neutron generator employing these reactions.

In view of the fact, therefore, that numerous modifications and departures may now be made by those skilled in the art, the invention herein is to be construed as limited only by the spirit and scope of the appended claims.

What is claimed is:

1. In a neutron generator tube a gas mixture serving as a source of ions for acceleration into neutron producing collisions with a target which initially contains only non-radioactive isotopes of hydrogen, said mixture containing tritium and deuterium gases respectively in the proportion $f$ and $1-f$, wherein $f$ is determined by the formula $$f=\frac{r}{1+r}$$

where $r$ equals the ratio of neutron yield of the deuterium on tritium reaction to the yield of the tritium on deuterium reaction at the energy of said accelerated ions.

2. In a neutron generator tube, a gas mixture serving as a source of ions for acceleration into neutron producing collisions with a target which initially contains only non-radioactive isotopes of hydrogen, said gas mixture having a proportion of tritium to deuterium determined by the ratio of neutron yields of the deuterium on tritium to the tritium on deuterium reactions whereby the build up of tritium on the target and the resulting increase of deuterium on tritium reactions during neutron producing collisions serves to balance out loss of neutrons due to tritium on tritium collisions, thereby providing a constant level neutron flux.

References Cited in the file of this patent

UNITED STATES PATENTS

| | | |
|---|---|---|
| 2,712,081 | Fearon et al. | June 28, 1955 |
| 2,926,271 | Brinkerhoff et al. | Feb. 23, 1960 |
| 2,983,834 | Reiffel | May 9, 1961 |